US005404807A

United States Patent [19]

Takemura

[11] Patent Number: 5,404,807

[45] Date of Patent: Apr. 11, 1995

[54] THREE DIMENSIONAL IMAGE FORMATION PROCESS

[75] Inventor: Toru Takemura, Tokyo, Japan

[73] Assignee: Riso Kagaku Corporation, Tokyo, Japan

[21] Appl. No.: 70,545

[22] Filed: Jun. 2, 1993

[30] Foreign Application Priority Data

Jun. 9, 1992 [JP] Japan .................................. 4-149103
Jul. 7, 1992 [JP] Japan .................................. 4-179826

[51] Int. Cl.[6] ........................ B41L 13/12; B29C 33/38

[52] U.S. Cl. ................................ 101/129; 101/401.1; 427/282; 264/130; 264/132

[58] Field of Search ..................... 101/127, 129, 424.2, 101/127.1, 128.1, 114, 401.1; 427/282; 264/130, 132

[56] References Cited

U.S. PATENT DOCUMENTS 3,658,977 4/1972 Baker .................................. 101/129
4,324,815 4/1982 Mitani et al. ......................... 427/282
5,000,089 3/1991 Uchiyama ........................... 101/129
5,174,201 12/1992 Andris et al. ....................... 101/129
5,244,620 9/1993 Uchiyama ........................... 427/282

FOREIGN PATENT DOCUMENTS 5321 3/1979 Japan .................................. 101/129
59-098890 6/1984 Japan .
4-279682 2/1993 Japan .
2227456 1/1990 United Kingdom .

*Primary Examiner*—Edgar S. Burr
*Assistant Examiner*—Stephen R. Funk
*Attorney, Agent, or Firm*—Fay, Sharpe, Beall, Fagan, Minnich & McKee

[57] ABSTRACT

A three-dimensional image formation process and an image separating agent used therefor are provided. The process comprises the steps of passing a flowable image forming material through a perforated stencil sheet having a perforated image from one surface to the other to form a three-dimensional image consisting of a flowable image forming material (ex. silicone resin) corresponding to the perforated image of the stencil sheet on the other surface; pushing out an image separating agent (ex. $CaCO_3$ paste) from the stencil sheet side to the three-dimensional image side to form a separation layer between the three-dimensional image and the stencil sheet; hardening the three-dimensional image in this condition; and separating the three-dimensional image from the stencil sheet. The above image separating agent contains a fine particulate thixotropic agent (ex. $CaCO_3$) as a main component, and has one minute spread value SP of the following formula:

$$SP \leqq 26 + 0.2X$$

$$20 \leqq X \leqq 70$$

wherein X is the weight percent of the fine particulate thixotropic agent.

6 Claims, 1 Drawing Sheet

THREE DIMENSIONAL IMAGE FORMATION PROCESS

BACKGROUND OF THE INVENTION

1. Field of the Invention

The present invention relates to a three-dimensional image formation process and an image separating agent. Specifically, it relates to a three-dimensional image formation process and an image separating agent which are preferable for forming a three-dimensional image using a stencil sheet.

2. Description of the Prior Art

With reference to methods for forming in-relief (steric) images such as those of a letter and a picture, there is known the method of making an intaglio of a picture, following by pouring a fused metal or resin into the intaglio, solidifying and removing the resulting image; and there is known the method of directly cutting out an image from an image material to bring out it in relief. There were, however, some problems in that the above preparation processes are complicated and requires a lot of time and expense.

The present inventor provides a process of formation of the three-dimensional images which solves the problems described above, that is: an image formation method wherein a flowable image forming material is passed through a perforated stencil sheet from one side to the other to form a three-dimensional image having a shape corresponding to the perforated stencil sheet (Japanese patent application laid-open No. Hei 2-276669).

It is possible to easily obtain a three-dimensional image using a stencil sheet by the method described above. However, when the fluid image forming material passed through the perforated master sheet is hardened, the hardened material is inclined to stick to the master sheet firmly. To prevent this, a method for hardening the material by first passing the flowable image forming material through the stencil sheet, and then, passing an unhardened or slowly hardening material under the above hardening condition of the material. However, even in this method, there were some problems as follows: (1) the back surface of a separated three-dimensional image does not become smooth, and three-dimensional images having a smooth back surface cannot be obtained; (2) the stencil sheet after its separation is plugged up and cannot be reused; and (3) the image forming material adheres to the stencil sheet and hardens unless the operation is promptly completed.

SUMMARY OF THE INVENTION

It is, accordingly, a main object of the invention to provide a three-dimensional image formation process and an image separating agent which can solve the problems in the prior art, separate a three-dimensional image having a smooth back surface from a stencil sheet easily and be able to reuse the stencil sheet.

Considering and keenly examining the above problems, the present inventor has found that a hardened three-dimensional image can be cleanly separated from a stencil sheet by passing an image forming material through the stencil sheet followed by a particular image separating agent containing a fine particulate thixotropic agent (e.g. inorganic pigments, extenders, metallic powders and the like) as a main component, and having a specific spread meter value, and by forming a separation layer, and the present invention is attained.

Namely, the present invention relates to a three-dimensional image formation process comprising the steps of passing a flowable image forming material through a perforated stencil sheet having a predetermined perforated image from one surface to the other to form a three-dimensional image consisting of a flowable image forming material corresponding to the perforated image of the stencil sheet on the other surface described above; pushing out an image separating agent from the stencil sheet side to the three-dimensional image side to form a separation layer between the three-dimensional image and the stencil sheet; hardening the three-dimensional image and removing the three-dimensional image from the stencil sheet.

The above image separating agent preferably contains a fine particulate thixotropic additive as a main component, and has a one minute spread value of (26+0.2X) or less where X indicates the weight percentage of a fine particulate thixotropic agent in the image separating agent. In the above equation, X (%) is in the range of 20 to 70.

A stencil sheet used in the invention can be obtained by laminating a heatsensitive film to a porous substrate. The stencil sheet is perforated with a thermal head or a flash-light so as to perforate the film corresponding to the image portion of the manuscript by absorption of heat.

A flowable image forming material used in the invention needs a passable flowability through the perforation in the perforated stencil sheet and a shape holding property that can stably hold a predetermined shape after it is pushed out. As for a material satisfying such a condition, a material having a thixotropy that manifests its flowability only when a force is applied on it, for example, a resin material such as a silicone resin is preferred. The silicone resin is preferably of a humid hardening type. In this case, the formed image reacts with moisture in the air within a comparatively short period of time thus hardening. With respect to silicone resins, thermosetting type resins, photopolymerized curing type resins, ultraviolet curing type resins, and so forth may be used. However, these resins will have to be heated or irradiated to be hardened. With respect to the thixotropic property of the flowable image forming material, the one minute spread value defined here is a measured value according to JIS K 5701-1980 (Testing method for lithographic and letterpress inks, 4.1.2 (3.1)). The one minute spread value is determined by placing a sample between a pair of parallel flat plates of the spread meter and measuring the diameter (mm) of the concentric circle of the sample spreaded under the load of the plate at a room temperature of 23° C. and a relative humidity of 50%. The one minute spread value of the flowable image forming material is preferably within the range of 15 to 35.

The image separating agent is made in a specific viscous state from the standpoint of a squeegee operation and ease of formation of a separation layer. This specific viscous state can be defined by the one minute spread value according to JIS K 5701-1980. The one-minute spread value on the spread meter for an image separating agent is (26+0.2X) or less, and preferably ranges from (26+0.2X) to 15, and more preferably, it is the range from 20 to 30. The force of the image separating agent for pushing an unhardened three-dimensional image becomes large when it contains a fine particulate thixotropic agent as a main component, thereby a separation layer between the three-dimensional image and the stencil sheet can be formed easily and uniformly.

As for a fine particulate thixotropic agent, inorganic metal compounds like inorganic pigments, clay, China clay, etc. and metal powder are preferred. One or more compounds selected from the group of $CaCO_3$, $Al(OH)_3$, $CaHPO_4$, $CaHPOH.2H_2O$, $Ca_2P_2O_7$, $(NaPO_3)x$, $SiO_2.nH_2O$ and $MgCO_3$ are more preferable. There are no particular limitation in the particle size of the inorganic compound so long as the particle is passable through the support body of the stencil sheet, but it is preferably in the range of 1 to 30 $\mu$m.

For components other than the thixotropic agent in the image separating agent, mediums like surface active agents, plasticizers, resins, solvents, etc. can be contained. The viscous state of the image separating agent can be controlled by the content of the mediums. However, the content of the above thixotropic agent in the image separating agent is preferably from 20 to 70 wt. %, and more preferably from 30 to 60 wt. %.

Further, the hardness of the image separating agent is preferably harder than that of the flowable image forming material. In order to remove easily the separating agent adhered to the three-dimensional image and to reuse the stencil sheet, the image separating agent is preferably of a water-soluble type.

After passing a flowable image forming material through the perforated stencil sheet from the one surface to the other by a squeegee means, the image separating agent is applied to the stencil sheet to be pushed out through the stencil sheet to the other surface by a squeegee means. As for a squeegee means, a plastic sheet, a thin metal plate, a rubber roll, etc. may be used. The separation layer, which is formed between the three-dimensional image and the stencil sheet, holds a flowable image forming material having a steric shape corresponding to the perforated image on the stencil sheet while the flowable image forming material is hardening. After hardening, the three-dimensional image is separated from the stencil sheet. In the case where the image separating agent is of a water soluble type, the separation layer adhered to the stencil sheet can easily be removed by washing with water, and the stencil sheet removed from the separation layer can be reused.

Furthermore, the hardening as defined in the invention does not mean that any elasticity is lost, but it means that there is no more plastic deformation even though there may be elastic deformation caused by an external force.

DETAILED DESCRIPTION OF PREFERRED EMBODIMENTS

Figure 1:
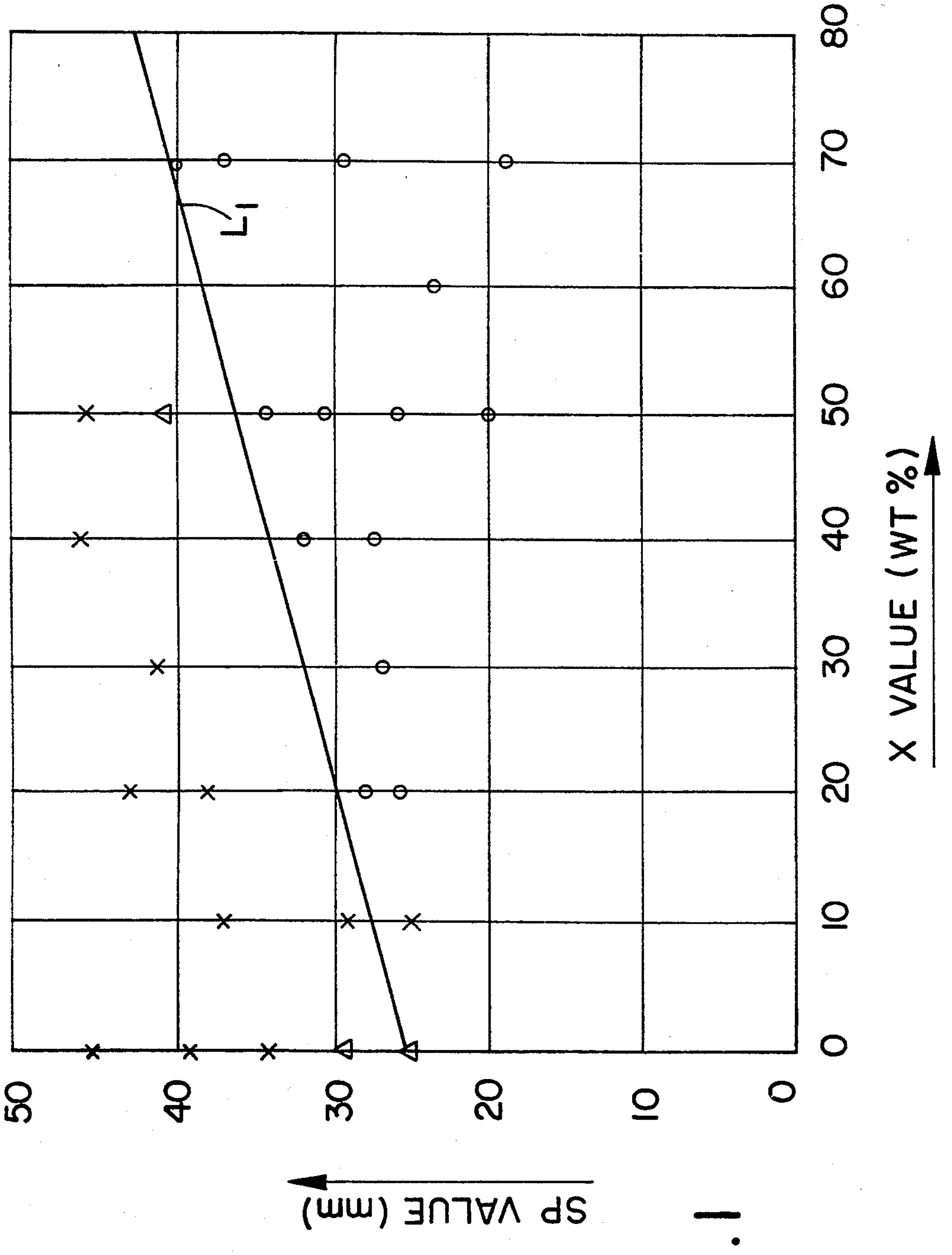
FIG. 1 is a view showing the relation between the X value (wt. % of a thixotropic agent) of an image separating agent and the total evaluation of SP values (one minute spread values on the spread meter according to JIS K 5701-1980).

A detailed description of the invention will be given accompanied by preferred embodiments. "Parts" in the following embodiment refers to weight parts.

Examples 1 to 6

Water, glycerol and carboxymethylcellulose (CMC) were mixed together at a composition ratio (Unit: weight part) shown in Table 1, to give a medium solution. Subsequently, $CaCO_3$ as a fine particulate thixotropic agent and a surface active agent (sodium laurylsulfate) were added to the medium solution to give a coarse paste, and then, which was mixed by a triple ball mill and defoamed to produce image separating agents.

The perforating of the stencil sheet was carried out by a portable stencil printer (PRINTGOKKO (registered trademark), Riso Kagaku Corporation product) to form a perforated image on the stencil sheet. A flowable image forming material consisting of a silicone resin was passed from the upper surface of the stencil sheet to its lower surface by squeegeeing while holding the stencil sheet horizontally in the space, to form a three-dimensional image adhered to the stencil sheet. Next, the above described image separating agent was pushed out from the upper surface of the stencil sheet to its lower surface by squeegeeing to form a separation layer between the flowable image forming material and the stencil sheet. In this state, the preceeding flowable image forming agent was hardened with moisture, followed by washing with water to remove the objective three-dimensional image. Squeegeeing times when the separation layer was formed, feeling for operation, push force, the surface condition of the separated three-dimensional image after washing and the one minute spread value on the spread meter (SP value) were observed and measured. The thus obtained results are given in Table 2. In these examples, the SP value of the flowable image forming material was 26.

TABLE 1

| | $CaCO_3$ | Glycerol | CMC | Surfactant | Water |
|---|---|---|---|---|---|
| Example 1 | 20.0 | 20.0 | 4.0 | 1.0 | 55.0 |
| Example 2 | 30.0 | 20.0 | 3.0 | 1.0 | 46.0 |
| Example 3 | 40.0 | 20.0 | 2.0 | 1.0 | 37.0 |
| Example 4 | 50.0 | 20.0 | 1.5 | 1.0 | 27.5 |
| Example 5 | 60.0 | 20.0 | 1.0 | 1.0 | 18.0 |
| Example 6 | 70.0 | 20.0 | 0.2 | 1.0 | 8.8 |

TABLE 2

| | $CaCO_3$ content | Squeegeeing times*1 | Push force | Feeling for operation | Condition of the surface the separated material*2 | SP value *3[mm] |
|---|---|---|---|---|---|---|
| Example 1 | 20 wt % | 30 | Δ | ○ | ○-Δ | 26 |
| Example 2 | 30 wt % | 15 | ○ | ○ | ○ | 27 |
| Example 3 | 40 wt % | 12 | ○ | ◎ | ○ | 27 |
| Example 4 | 50 wt % | 10 | ◎ | ◎ | ○ | 26 |
| Example 5 | 60 wt % | 10 | ◎ | ◎ | ○ | 25 |
| Example 6 | 70 wt % | 10 | ◎ | ○ | ○ | 29 |

*1Squeegeeing times required to separate an image forming material from a stencil master.
*2○ indicates the case that the surface of the separated material is in a smooth condition; X indicates the case that there are any irregularities on the surface of the separated material; and Δ indicates the case that the surface of the separated material is in an intermediate condition between X and ○.
*3Measured by the method based on JIS K 5701-1980.

From Tables 1 and 2, in Examples 1 to 6 using the image separating agents of the invention, since each image separating agent contains fine particles as a main component, a push force is moderately large, and the separation layer can be formed by less squeegeeing times. Moderate resistance arose during squeegeeing, resulting in giving a good feeling for the operation, and further, it was found that the obtained three-dimensional image has a smooth surface.

Examples 7 to 15 and Comparative Examples 1 to 17

At the composition ratio (unit: weight part) shown in Table 3, each image separating agent was prepared according to the process similar to that in Example 1, and a three-dimensional image was obtained the same manner as in Example 1. Squeegeeing times when each separation layer was formed, feeling for the operation, push force, the surface condition of each separated three-dimensional image after washing, and the one minute spread value on the spread meter were observed and measured. The results are shown in Table 4.

TABLE 3

| | $CaCO_3$ | Glycerol | CMC | Surfactant | Water |
|---|---|---|---|---|---|
| Comp. ex. 1 | 0 | 20 | 7 | 1 | 72 |
| Comp. ex. 2 | 0 | 20 | 6.5 | 1 | 72.5 |
| Comp. ex. 3 | 0 | 20 | 6 | 1 | 73 |
| Comp. ex. 4 | 0 | 20 | 5 | 1 | 74 |
| Comp. ex. 5 | 0 | 20 | 4 | 1 | 75 |
| Comp. ex. 6 | 0 | 20 | 3 | 1 | 76 |
| Comp. ex. 7 | 10 | 20 | 5.5 | 1 | 64.5 |
| Comp. ex. 8 | 10 | 20 | 4.5 | 1 | 65.5 |
| Comp. ex. 9 | 10 | 20 | 3 | 1 | 66 |
| Example 7 | 20 | 20 | 7 | 1 | 52 |
| Example 8 | 20 | 20 | 5 | 1 | 54 |
| Comp. ex. 10 | 20 | 20 | 3 | 1 | 56 |
| Comp. ex. 11 | 20 | 20 | 2.5 | 1 | 56.5 |
| Comp. ex. 12 | 20 | 20 | 2 | 1 | 57 |
| Comp. ex. 13 | 30 | 20 | 1.5 | 1 | 47.5 |
| Example 9 | 40 | 20 | 1.5 | 1 | 37.5 |
| Comp. ex. 14 | 40 | 20 | 1 | 1 | 38 |
| Example 10 | 50 | 20 | 2 | 1 | 27 |

TABLE 3-continued

| | $CaCO_3$ | Glycerol | CMC | Surfactant | Water |
|---|---|---|---|---|---|
| Example 11 | 50 | 20 | 1 | 1 | 28 |
| Example 12 | 50 | 20 | 0.90 | 1 | 28.10 |
| Comp. ex. 15 | 50 | 20 | 0.75 | 1 | 28.25 |
| Comp. ex. 16 | 50 | 20 | 0.5 | 1 | 28.5 |
| Example 13 | 70 | 20 | 0.4 | 1 | 8.6 |
| Example 14 | 70 | 20 | 0 | 1 | 9 |
| Example 15 | 70 | 20 | 0.1 | 1 | 8.9 |
| Comp. ex. 17 | 80 | 10 | 0.1 | 1 | 8.9 |

TABLE 4

| | SP value (mm) | X value (wt. %) | Squeegeeing times | Push force | Feeling for operation | Condition of the surface of the separated material | Total evaluation |
|---|---|---|---|---|---|---|---|
| Comp. ex. 1 | 19 | 0 | 15 | Δ | Δ | ○ | Δ |
| Comp. ex. 2 | 25.5 | 0 | 25 | ○-Δ | Δ | ○ | Δ |
| Comp. ex. 3 | 29.5 | 0 | 25 | ○-Δ | Δ | X | Δ |
| Comp. ex. 4 | 34 | 0 | X*4 | X | X | —*5 | X |
| Comp. ex. 5 | 39.5 | 0 | X | X | X | — | X |
| Comp. ex. 6 | 45 | 0 | X | X | X | — | X |
| Comp. ex. 7 | 26 | 10 | 50 | Δ-X | Δ | X | X |
| Comp. ex. 8 | 29.5 | 10 | 50 | Δ-X | Δ | X | X |
| Comp. ex. 9 | 45 | 10 | X | X | X | — | X |
| Example 7 | 20.5 | 20 | 15 | ○ | ○ | ○ | ○ |
| Example 8 | 28 | 20 | 25 | ○ | Δ | ○ | ○ |
| Comp. ex. 10 | 34.5 | 20 | 40 | Δ | Δ | X | X |
| Comp. ex. 11 | 38 | 20 | X | X | Δ | — | X |
| Comp. ex. 12 | 43 | 20 | X | X | Δ | — | X |
| Comp. ex. 13 | 41 | 30 | X | X | Δ | — | X |
| Example 9 | 32 | 40 | 30 | Δ | Δ | ○ | ○ |
| Comp. ex. 14 | 46 | 40 | X | X | Δ | — | X |
| Example 10 | 20 | 50 | 10 | ○ | ○ | ○ | ○ |
| Example 11 | 30.5 | 50 | 15 | ○ | ○ | ○ | ○ |
| Example 12 | 34.5 | 50 | 20 | ○ | ○ | ○ | ○ |
| Comp. ex. 15 | 40.5 | 50 | 30 | ○-Δ | ○-Δ | X | Δ |
| Comp. ex. 16 | 45.5 | 50 | X | X | Δ-X | — | X |
| Example 13 | 19 | 70 | 10 | ○ | ○ | ○ | ○ |
| Example 14 | 37 | 70 | 18 | ○ | ○ | ○ | ○ |
| Example 15 | 40 | 70 | 20 | ○ | ○ | Δ | ○ |
| Comp. ex. 17 | — | 80 | Not in a viscous state | | | | — |

*4 X indicates that the image forming material could not be separated from the master even though repeated 50 times.
*5 —indicates that both of them are inseparable.

On the basis of the results in Tables 2 and 4, FIG. 1 shows the relationship between X values (weight % of thixotropic agent) and SP values. In FIG. 1, the symbols of total evaluation (○, Δ and X) given in the Examples and Comparative examples in Tables 2 and 4 are plotted against a vertical axis (SP value) and a horizontal axis (X value). It is noted from FIG. 1 that when SP values (mm) and X values (wt. %) satisfy the following formulas:

$$19 \leqq SP \leqq 26+0.2X \quad (1)$$

$$20 \leqq X \leqq 70 \quad (2)$$

preferably in the range: $20 \leqq SP \leqq 30$ and $20 \leqq X \leqq 70$, the obtained three-dimensional images have smooth surfaces, while moderate resistance during squeezing and a good feeling for the operation could be obtained in the processing.

According to the three-dimensional image formation process of the invention, a three-dimensional image can be separated easily and uniformly to be able to give the three-dimensional image having a smooth surface by using a specific image forming agent containing a fine particulate thixotropic agent as a main component and having a specific spread meter value. Further, once used stencil sheets can be reused since the image forming agent of the invention can be removed by washing with water. The three-dimensional image obtained by the invention is utilized as emblems, badges, appliques and other hobby goods.

What I claim is:

1. A three-dimensional image formation process comprising the following steps of:

passing a flowable image forming material through a first side of a perforated stencil sheet having a perforated image extending from said first side to a second side to form a three-dimensional image, corresponding to the perforated image of the stencil sheet, on said second side;

pushing out an image separating agent including a fine particulate thixotropic agent from the first side to the second side of the stencil sheet to form a separation layer between the three-dimensional image and the stencil sheet;

hardening the three-dimensional image in this condition; and separating the three-dimensional image from the stencil sheet.

2. A three-dimensional image formation process according to claim 1, said image separating agent containing the fine particulate thixotropic agent as a main component, and has one minute spread value SP of the following formula:

$$19 \leqq SP(mm) \leqq 26+0.2X$$

$$20 \leqq X \leqq 70$$

wherein X is the weight percent of the fine particulate thixotropic agent in the image separating agent.

3. A three-dimensional image formation process according to claim 2, wherein said image separating agent is of a water-soluble type.

4. A three-dimensional image formation process according to claim 2, wherein said particulate thixotropic agent is fine powders of one or more inorganic metal compound(s) selected from the group consisting of $CaCO_3$, $Al(OH)_3$, $CaHPO_4$, $CaHPOH.2H_2O$, $Ca_2P_2O_7$, $(NaPO_3)x$, $SiO_2.nH_2O$, and $MgCO_3$.

5. A three-dimensional image formation process according to claim 2, wherein said one minute spread value is 19 to 35 mm.

6. A three-dimensional image formation process according to claim 1, wherein the content of said thixotropic agent is in the range of 20 to 70 wt. % of the image separating agent.

* * * * *